Dec. 26, 1950   J. F. ANDERSON   2,535,186
STOVEPIPE CONNECTOR FOR CHIMNEYS AND THE LIKE
Filed Dec. 11, 1946

Inventor
JOEL F. ANDERSON

By Williamson & Williamson
Attorneys

Patented Dec. 26, 1950

2,535,186

UNITED STATES PATENT OFFICE 2,535,186

STOVEPIPE CONNECTOR FOR CHIMNEYS AND THE LIKE

Joel F. Anderson, Minneapolis, Minn.

Application December 11, 1946, Serial No. 715,525

2 Claims. (Cl. 285—185)

1

This invention relates to couplings for interconnecting pipes and their tubular elements with sealed effect and for connecting said pipes to stoves and the like.

This invention is an improvement over United States Letters Patent Number 2,099,984, granted November 23, 1937, to Gustaf Lundquist, entitled "Pipe Connectors."

Although the Lundquist coupling has been successful and many couplings sold commercially, my improved coupling provides several valuable features not present in the Lundquist coupling.

My invention provides a more efficient, less expensive coupling than Lundquist and has a construction well adapted for modern methods of sheet metal manufacture. My improved coupling provides an efficient guiding and centering means to facilitate initially thrusting pipes therein and it is much easier to remove a pipe from my coupling because the gripping claws present in the Lundquist coupling have been removed.

It is an object of this invention to provide a novel, simple, relatively inexpensive coupling for interconnecting stove pipes, furnace pipes and the like and also connecting such pipes to stoves, boilers, chimneys and the like.

More specifically, it is an object of my invention to provide a coupling constructed for stove pipes and the like which can be manufactured at low cost and provides an efficient, sealed joint which can be easily removed.

These and other objects and advantages of the invention will more fully appear from the following description made in connection with the accompanying drawings wherein like reference characters refer to the same parts throughout the views and in which.

Figure 1:
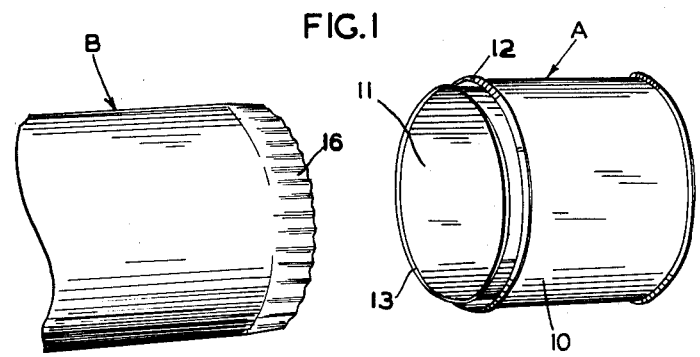
Fig. 1 is a perspective view showing a coupling and a stove pipe about to be thrust therein.
Figure 2:
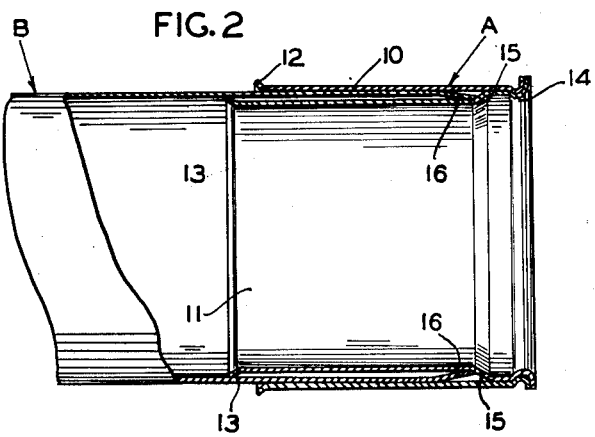
Fig. 2 is a longitudinal sectional view showing a pipe thrust therein, having its sides embraced by the outer tubular member and its end sealed by the inner sleeve member.
Figure 3:
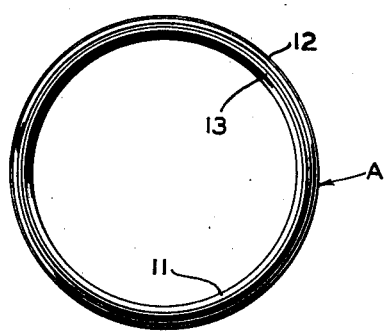
Fig. 3 is a transverse sectional view of the coupling with a pipe thrust therein.

A coupling designated as an entirety by the letter A is provided having an outside tubular member 10 and an inner sleeve member 11. The coupling A is adapted to receive a stove pipe designated as an entirety by the letter B. Stove pipe B is of usual design and construction, having a crimped end providing a slightly diminished extremity 16 to facilitate initially thrusting said pipe into a coupling such as here provided. The outer tubular member 10 is substantially cylindrical in shape and can be made from ordinary sheet metal. One end 12 of tube 10 is flared outwardly to form an outer guide for receiving and guiding stove pipe B in its initial inward thrust into the coupling A. The inner sleeve 11 has one end 13, protruding beyond flared end 12 of tube 10. This protruding end 13 is of somewhat smaller diameter than the diminished end 16 of stove pipe B and internally guides stove pipe B in its initial thrust into coupling A.

The other end of inner sleeve 11, terminates adjacent to the end of tube 10 opposite to flared end 12. A crimped joint connects the inner sleeve 11 with the outer tube 10 and forms an internal bead 14 substantially adjacent the end of the coupling opposite to ends 12 and 13 of the tube and sleeve respectively.

Slightly inwardly from bead 14, the sleeve 11 is flared out against the inner periphery of tube 10, forming an annular, conical shoulder 15 which engages with wedging effect, the diminished end 16 of stove pipe B to form a sealed connection. Coupling A may be connected to a stove at the end adjacent to bead 14 and bead 14 has a sealing effect by tightly embracing the pipe-like portion of the stove.

The stove pipe B is initially passed over the protruding guiding and centering end 13 of the inner sleeve and then being further guided by flared end 12 of tube 10, it is thrust in between tube 10 and sleeve 11, tightly embracing the inner periphery of tube 10. Stove pipe B is continuously thrust into coupling A until the inner extremity 16 firmly embraces, with wedge-like action, shoulders 15 of sleeve 11. This inside periphery of tube 10 engages a substantial portion of stove pipe B, thus forming a rigid connection which will support the stove pipe against lateral displacement.

It will be seen that a highly efficient, inexpensively constructed coupling has been provided. It will also be seen that this coupling is particularly adapted to modern sheet metal manufacturing methods, making it possible to inexpensively manufacture said coupling. This coupling provides two sealing functions. The outside of stove pipe B is tightly embraced for a substantial distance from its end and its inward end 11 is firmly engaged and sealed by shoulder 15 of the inner sleeve 11. For installation on a stove, the crimp joint between tube 10 and sleeve 11 forms an inwardly disposed bead for sealing and retaining said connection to the stove.

The protruding end 13 guides and centers the initial thrust of stove pipe B as does the outwardly flared end 12 of tube 10. The only force holding the stove pipe within said tube 10 is the fractional force exerted between the outward portion of stove pipe B and the inner periphery of tube 10. Thus, it will be seen that my connection is easier to uncouple than a connection as provided in Lunquist with gripping claws holding the stove pipe in the coupling even though my connection provides a better sealed connection than does Lundquist.

It will of course, be understood that various changes may be made in the form, details, arrangement and proportions of the parts without departing from the scope of my invention.

What I claim is:

1. A device for connecting stove pipes to a chimney comprising an outer tubular pipe embracing member having one end thereof outwardly flared to guide the initial thrust of a pipe therein and adapted to receive and tightly embrace a portion of said pipe, an inner sleeve concentrically disposed within said outer tubular member and extending at least the full length thereof in concentrically spaced relation thereto to form an air space therewith to prevent excessive heating of the outer tubular member, an inwardly extending peripherally formed sealing bead securely joining the other end portion of said sleeve and said outer tubular member to form a peripheral recess in the outer circumference of said joined portions to receive the sealing mortar forming the connection between the outer member and the chimney and interlock said connector to the chimney.

2. A connector for attaching stove pipes to a chimney and comprising an outer tubular pipe-embracing member having the forward end thereof flared slightly outwardly to initially guide a stove pipe therein and adapted to receive and tightly embrace a portion of said pipe, an inner tubular member concentrically disposed in spaced relation within said outer member and substantially coextensive therewith to form an air space between said concentrically disposed members, the rear end of said inner member being flared outwardly to close this air space and an interconnection bead formed between said members to rigidly interconnect the same, the terminus of said passage formed by the enlargement of the inner sleeve being truncated to sealingly receive the forward end of a stove pipe thrust into said connector.

JOEL F. ANDERSON.

REFERENCES CITED

The following references are of record in the file of this patent:

UNITED STATES PATENTS

| Number | Name | Date |
|---|---|---|
| 1,197,858 | Redman | Sept. 12, 1916 |
| 2,099,984 | Lundquist | Nov. 23, 1937 |
| 2,260,221 | Gray | Oct. 21, 1941 |